United States Patent
Moriya

(10) Patent No.: US 10,073,367 B1
(45) Date of Patent: Sep. 11, 2018

(54) TONER, TONER CARTRIDGE, AND IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Shiho Moriya, Shizuoka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 15/485,415

(22) Filed: Apr. 12, 2017

(30) Foreign Application Priority Data

Mar. 9, 2017 (JP) ................................ 2017-044780

(51) Int. Cl.
| | | |
|---|---|---|
| *G03G 9/09* | (2006.01) | |
| *G03G 9/087* | (2006.01) | |
| *G03G 9/093* | (2006.01) | |
| *G03G 15/20* | (2006.01) | |
| *C08F 293/00* | (2006.01) | |

(52) U.S. Cl.
CPC ..... *G03G 9/08795* (2013.01); *G03G 9/08733* (2013.01); *G03G 9/0924* (2013.01); *G03G 9/09392* (2013.01); *C08F 293/005* (2013.01); *G03G 9/0926* (2013.01); *G03G 15/2007* (2013.01)

(58) Field of Classification Search
CPC .................................................. G03G 9/0926
See application file for complete search history.

(56) References Cited

U.S. PATENT DOCUMENTS

| 8,974,993 B2 | 3/2015 | Richards-Johnson et al. |
|---|---|---|
| 2008/0233313 A1 | 9/2008 | Chatow et al. |
| 2011/0143274 A1* | 6/2011 | Iftime .................. G03G 9/0804 430/108.2 |
| 2011/0143278 A1 | 6/2011 | Iftime et al. |
| 2014/0120704 A1* | 5/2014 | Kim .................. H01L 21/02532 438/487 |
| 2014/0147778 A1 | 5/2014 | Murakami et al. |
| 2014/0272339 A1 | 9/2014 | Tyagi et al. |
| 2015/0248074 A1 | 9/2015 | Suzuki et al. |
| 2016/0216627 A1* | 7/2016 | Hiraide ................ G03G 9/0926 |

FOREIGN PATENT DOCUMENTS

| EP | 1 918 857 A2 | 5/2008 |
|---|---|---|
| JP | 2006-249354 A | 9/2006 |
| JP | 2006-249355 A | 9/2006 |

OTHER PUBLICATIONS

Extended European Search Report dated Jun. 11, 2018, received in corresponding European application No. 18 16 0006.5, 9 pages.

* cited by examiner

*Primary Examiner* — Hoa Van Le
(74) *Attorney, Agent, or Firm* — Foley & Lardner LLP

(57) ABSTRACT

An object of the embodiments herein is to provide a toner having excellent visibility upon irradiation with UV light, a toner cartridge, and an image forming apparatus.

According to one embodiment, a toner contains at least two or more fluorescent coloring agents selected from the group consisting of a first fluorescent coloring agent, a second fluorescent coloring agent, and a third fluorescent coloring agent, and a binder resin. The first fluorescent coloring agent has a fluorescence peak in a wavelength region of 400 nm or more and less than 500 nm. The second fluorescent coloring agent has a fluorescence peak in a wavelength region of 500 nm or more and less than 600 nm. The third fluorescent coloring agent has a fluorescence peak in a wavelength region of 600 nm or more and less than 650 nm.

21 Claims, 1 Drawing Sheet

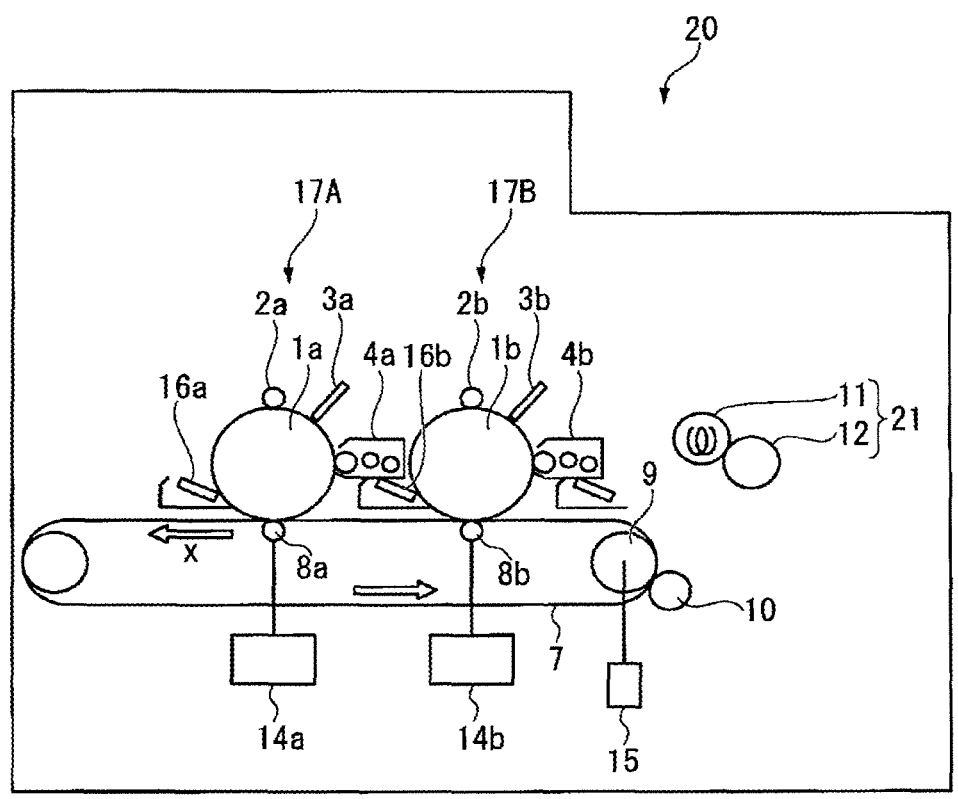

TONER, TONER CARTRIDGE, AND IMAGE FORMING APPARATUS

CROSS-REFERENCE TO RELATED APPLICATION

This application is based upon and claims the benefit of priority from Japanese Patent Application No. 2017-044780, filed Mar. 9, 2017, the entire contents of which are incorporated herein by reference.

FIELD

Embodiments described herein relate to a toner, a toner cartridge, and an image forming apparatus.

BACKGROUND

A toner which emits fluorescence in a visible light region by irradiation with UV light such as black light is put into practical use in security documents, etc. As the toner which emits fluorescence, a toner which emits fluorescence in a visible light region of red, green, or blue color, each of which is one of the three primary colors of light is known. For example, a toner which emits blue fluorescence by irradiation with black light or the like is known.

Such a toner is required to have visibility upon irradiation with UV light such as black light.

In general, commercially available paper contains a fluorescent whitening agent. Paper containing a fluorescent whitening agent emits blue light by irradiation with UV light such as black light. That is, a wavelength region of fluorescence emitted from commercially available paper by irradiation with black light overlaps with a wavelength region of blue fluorescence. Therefore, blue fluorescence emitted from a toner printed on commercially available paper often is hardly distinguished from fluorescence emitted from the commercially available paper. Therefore, the toner which emits blue fluorescence may have insufficient visibility upon irradiation with UV light. Also in a case of a toner which emits green fluorescence, the fluorescence emitted from commercially available paper and the green fluorescence often are hardly distinguished from each other. Therefore, the toner which emits green fluorescence also may have insufficient visibility upon irradiation with UV light.

A toner which emits red fluorescence often has a weak luminescence intensity of the fluorescence, and therefore may have insufficient visibility upon irradiation with UV light. Further, the toner which emits red fluorescence often has low light resistance and low heat resistance, and therefore may not be of practical use.

Examples of a method for improving visibility upon irradiation with UV light include a method in which the content of a fluorescent coloring agent in the toner is increased and a method in which the amount of the toner to be adhered to a recording medium such as paper is increased.

However, when the content of a fluorescent coloring agent in the toner is increased, essential characteristics required for the toner such as dispersibility and low-temperature fixability may be deteriorated. Further, when the amount of the toner to be adhered to paper or the like is increased, even if UV light such as black light is not irradiated, the adhered toner may be easily recognized by the naked eye. Therefore, the above-mentioned methods are not preferred from the viewpoint of security or the like.

SUMMARY OF THE INVENTION

An object of the embodiments herein is to provide a toner having excellent visibility upon irradiation with UV light, a toner cartridge, and an image forming apparatus.

A toner of an embodiment contains at least two or more fluorescent coloring agents selected from the group consisting of a first fluorescent coloring agent, a second fluorescent coloring agent, and a third fluorescent coloring agent, and a binder resin. The first fluorescent coloring agent has a fluorescence peak in a wavelength region of 400 nm or more and less than 500 nm. The second fluorescent coloring agent has a fluorescence peak in a wavelength region of 500 nm or more and less than 600 nm. The third fluorescent coloring agent has a fluorescence peak in a wavelength region of 600 nm or more and less than 650 nm.

BRIEF DESCRIPTION OF THE DRAWINGS

FIG. 1 is side view showing an image forming apparatus of an embodiment.

DETAILED DESCRIPTION

Hereinafter, a toner of an embodiment will be described.

In general, according to one embodiment, a toner contains at least two or more fluorescent coloring agents selected from the group consisting of a first fluorescent coloring agent, a second fluorescent coloring agent, and a third fluorescent coloring agent, and a binder resin. The "fluorescent coloring agent" refers to a coloring agent which emits fluorescence having a peak in a specific wavelength region by irradiation with UV light such as black light. The "fluorescence peak" refers to a convex portion of a spectrum measured for the intensity of fluorescence emitted from the fluorescent coloring agent by irradiation with UV light.

The first fluorescent coloring agent will be described.

The first fluorescent coloring agent has a fluorescence peak in a wavelength region of 400 nm or more and less than 500 nm (hereinafter, also referred to as "first wavelength region"). The first fluorescent coloring agent may have only one fluorescence peak or may have two or more fluorescence peaks in the first wavelength region.

The fluorescence peak of the first fluorescent coloring agent may be a clear peak (line spectrum) or may be a band spectrum with a width. The fluorescence peak is measured using a spectrofluorophotometer "RF-6000" (manufactured by Shimadzu Corporation) or the like.

The first fluorescent coloring agent emits blue light when being excited with excitation light such as UV light having a wavelength of 350 nm or more and less than 380 nm.

The first fluorescent coloring agent is not particularly limited, and examples thereof include known blue fluorescent coloring agents. Further, the first fluorescent coloring agent may be a synthesized fluorescent coloring agent or may be a commercially available product. Examples of the first fluorescent coloring agent include thiophene-based, coumarin-based, bisstyrylbenzene-based, and oxazole-based fluorescent coloring agents. Examples of the commercially available product of the first fluorescent coloring agent include "TINOPAL OB" (manufactured by BASF SE).

The second fluorescent coloring agent will be described.

The second fluorescent coloring agent has a fluorescence peak in a wavelength region of 500 nm or more and less than 600 nm (hereinafter, also referred to as "second wavelength region").

The second fluorescent coloring agent may have only one fluorescence peak or may have two or more fluorescence peaks in the second wavelength region.

The fluorescence peak of the second fluorescent coloring agent may be a clear peak (line spectrum) or may be a band spectrum with a width. The fluorescence peak is measured using a spectrofluorophotometer "RF-6000" (manufactured by Shimadzu Corporation) or the like.

The second fluorescent coloring agent emits green light when being excited with excitation light such as LW light having a wavelength of 350 nm or more and less than 380 nm.

The second fluorescent coloring agent is not particularly limited, and examples thereof include known green fluorescent coloring agents. Further, the second fluorescent coloring agent may be a synthesized fluorescent coloring agent or may be a commercially available product. Examples of the second fluorescent coloring agent include thiophene-based, β-quinophthalone-based, coumarin-based, bisstyrylbenzene-based, and oxazole-based fluorescent coloring agents. Examples of the commercially available product of the second fluorescent coloring agent include "CARTAX CXDP POWDER" (manufactured by Clariant K.K.).

The third fluorescent coloring agent will be described.

The third fluorescent coloring agent has a fluorescence peak in a wavelength region of 600 nm or more and less than 650 nm (hereinafter, also referred to as "third wavelength region").

The third fluorescent coloring agent may have only one fluorescence peak or may have two or more fluorescence peaks in the third wavelength region.

The fluorescence peak of the third fluorescent coloring agent may be a clear peak (line spectrum) or may be a band spectrum with a width. The fluorescence peak is measured using a spectrofluorophotometer "RF-6000" (manufactured by Shimadzu Corporation) or the like.

The third fluorescent coloring agent emits red light when being excited with excitation light such as UV light having a wavelength of 350 nm or more and less than 380 nm.

The third fluorescent coloring agent is not particularly limited, and examples thereof include known red fluorescent coloring agents. Further, the third fluorescent coloring agent may be a synthesized fluorescent coloring agent or may be a commercially available product. Examples of the third fluorescent coloring agent include β-quinophthalone-based and europium complex-based fluorescent coloring agents. Examples of the commercially available product of the third fluorescent coloring agent include "LUMILITE NANO R-Y202" (manufactured by SINLOIHI CO., LTD.)

As the first, second, third fluorescent coloring agents, both fluorescent dye and fluorescent pigment can be used.

The toner of the embodiment preferably has a fluorescence peak in each of at least two or more wavelength regions among the first wavelength region, the second wavelength region, and the third wavelength region. With respect to the fluorescence peaks of the toner of the embodiment, a distance between the maximum peaks in the respective wavelength regions is preferably 50 nm or more apart, more preferably 65 nm or more apart, further more preferably 80 nm or more apart.

When the distance between the maximum peaks in the respective wavelength regions is 50 nm or more apart, the toner of the embodiment easily emits light of a color other than blue by irradiation with UV light, and has excellent visibility on paper upon irradiation with UV light.

The maximum peak in each wavelength region refers to a peak with the maximum fluorescence intensity in any of the wavelength regions in which the toner of the embodiment has a fluorescence peak. For example, explanation will be made by showing a case where the toner of the embodiment has a fluorescence peak in each of the first wavelength region and the second wavelength region as an example. In this case, a distance between a fluorescence peak position showing the maximum fluorescence intensity in the first wavelength region and a fluorescence peak position showing the maximum fluorescence intensity in the second wavelength region is preferably 50 nm or more apart.

The toner of the embodiment preferably satisfies the following formula (1).

$$0.1 \text{ mass \%} \leq a+b+c \leq 45 \text{ mass \%} \quad (1)$$

In the formula (1), a represents the content (mass %) of the first fluorescent coloring agent with respect to 100 mass % of the total amount of the toner, b represents the content (mass %) of the second fluorescent coloring agent with respect to 100 mass % of the total amount of the toner, and c represents the content (mass %) of the third fluorescent coloring agent with respect to 100 mass % of the total amount of the toner.

The above a+b+c is preferably from 0.1 to 45 mass %, more preferably from 0.5 to 30 mass %, furthermore preferably from 2 to 20 mass %. When the above a+b+c is not more than the above upper limit, the dispersibility of the coloring agent in the toner excels. When the above a+b+c is not less than the above lower limit, the visibility when the toner is irradiated with UV light excels without increasing the amount of the toner to be adhered to paper or the like.

The above a is preferably from 0.01 to 35 mass %, more preferably from 0.05 to 23 mass %, further more preferably from 0.1 to 15 mass %.

The above b is preferably from 0.01 to 21 mass %, more preferably from 0.1 to 14 mass %, further more preferably from 0.5 to 8 mass %.

The above c is preferably from 0.01 to 21 mass %, more preferably from 0.1 to 14 mass %, further more preferably from 0.5 to 8 mass %.

When a, b, and c are within the above-mentioned preferred ranges, respectively, a toner having excellent dispersibility and excellent visibility upon irradiation with UV light is easily obtained.

The toner of the embodiment preferably contains the first fluorescent coloring agent.

When the toner of the embodiment contains the first fluorescent coloring agent, the luminescence intensity of the toner by irradiation with UV light easily increases, and thus, the visibility upon irradiation with UV light excels.

A preferred combination of the first fluorescent coloring agent, the second fluorescent coloring agent, and the third fluorescent coloring agent when the toner of the embodiment contains the first fluorescent coloring agent will be described.

When the toner of the embodiment contains the first fluorescent coloring agent and the second fluorescent coloring agent, the toner easily emits light of magenta color by irradiation with LTV light, and the visibility upon irradiation with UV light excels. When the toner of the embodiment contains the first fluorescent coloring agent and the third fluorescent coloring agent, the toner easily emits light of cyan color by irradiation with UV light, and the visibility upon irradiation with LTV light excels.

The toner of the embodiment more preferably contains the first fluorescent coloring agent, the second fluorescent coloring agent, and the third fluorescent coloring agent.

When the toner of the embodiment contains the first fluorescent coloring agent, the second fluorescent coloring agent, and the third fluorescent coloring agent, the toner easily emits light of white color by irradiation with UV light, and the visibility upon irradiation with UV light particularly excels. Incidentally, the "white color" as used herein refers to whiteness to such an extent that the whiteness can be visually perceived.

When the toner of the embodiment contains the first fluorescent coloring agent, the toner of the embodiment preferably satisfies the following formula (2).

$$0.05 \leq a/(b+c) \leq 3.0 \quad (2)$$

The a, b, and c in the formula (2) are the same as the a, b, and c in the formula (1).

The above a/(b+c) is preferably from 0.05 to 3.0, more preferably from 0.1 to 1.5, further more preferably from 0.2 to 1.0. When the above a/(b+c) is not more than the above upper limit, the toner easily emits light of a color other than blue by irradiation with UV light, and the visibility on paper upon irradiation with UV light excels. When the above a/(b+c) is not less than the above lower limit, the luminescence intensity of the toner by irradiation with UV light easily increases, and thus, the visibility excels.

A more preferred mode of the toner of the embodiment satisfies the following formulae (1) and (2).

$$0.1 \leq a+b+c \leq 45 \quad (1)$$

$$0.05 \leq a/(b+c) \leq 3.0 \quad (2)$$

A further more preferred mode of the toner of the embodiment satisfies the following formulae (3) and (4).

$$0.5 \leq a+b+c \leq 30 \quad (3)$$

$$0.1 \leq a/(b+c) \leq 1.5 \quad (4)$$

A particularly preferred mode of the toner of the embodiment satisfies the following formulae (5) and (6).

$$2 \leq a+b+c \leq 20 \quad (5)$$

$$0.2 \leq a/(b+c) \leq 1.0 \quad (6)$$

The toner of the embodiment contains at least two or more fluorescent coloring agents selected from the group consisting of the first fluorescent coloring agent, the second fluorescent coloring agent, and the third fluorescent coloring agent. Therefore, when the toner of the embodiment is excited with excitation light such as UV light having a wavelength of 350 nm or more and less than 380 nm, the toner easily emits light of a color other than blue. In particular, when the toner is printed on paper containing a fluorescent whitening agent, the visibility of light emitted from the toner of the embodiment by irradiation with UV light is improved.

The toner of the embodiment contains at least two or more fluorescent coloring agents selected from the group consisting of the first fluorescent coloring agent, the second fluorescent coloring agent, and the third fluorescent coloring agent, and a binder resin.

The binder resin will be described.

Examples of the binder resin which may be contained in the toner of the embodiment include known resins to be used as a binder resin of a toner such as a styrenic resin, an ethylenic resin, a polyester resin, an acrylic resin, a phenolic resin, an epoxy-based resin, an allyl phthalate-based resin, a polyamide-based resin, and a maleic acid-based resin. As the binder resin, any one type may be used alone or two or more types may be used in combination.

As the binder resin, a polyester resin having favorable fixability is preferred. Examples of the polyester resin include an amorphous polyester resin and a crystalline polyester resin. The binder resin of the embodiment preferably contains a crystalline polyester resin from the viewpoint of imparting excellent low-temperature fixability. The binder resin of the embodiment more preferably contains an amorphous polyester resin and a crystalline polyester resin. Incidentally, in the embodiment, polyester resins having a ratio of a softening point to a melting temperature (softening point/melting temperature) of 0.8 to 1.2 are referred to as "crystalline polyester resins", and the other polyester resins are referred to as "amorphous polyester resins".

Examples of the amorphous polyester resin include resins obtained by condensation polymerization of a dihydric or higher hydric alcohol and a divalent or higher valent carboxylic acid. Examples of the divalent or higher valent carboxylic acid include divalent or higher valent carboxylic acids, acid anhydrides thereof, and esters thereof. Examples of the ester include lower alkyl (having 1 to 12 carbon atoms) esters of divalent or higher valent carboxylic acids.

As the dihydric alcohol, an alkylene oxide adduct of bisphenol A is preferred. As the trihydric or higher hydric alcohol, sorbitol, 1,4-sorbitan, pentaerythritol, glycerol, or trimethylolpropane is preferred. As the divalent carboxylic acid, maleic acid, fumaric acid, terephthalic acid, or succinic acid substituted with an alkenyl group having 2 to 20 carbon atoms is preferred. As the trivalent or higher valent carboxylic acid, 1,2,4-benzenetricarboxylic acid (trimellitic acid), an acid anhydride thereof, or a lower alkyl (having 1 to 12 carbon atoms) ester thereof is preferred. As the dihydric or higher hydric alcohol and the divalent or higher valent carboxylic acid, any one type may be used alone or two or more types may be used in combination.

When the above-mentioned dihydric or higher hydric alcohol and divalent or higher valent carboxylic acid are subjected to condensation polymerization, a catalyst which accelerates the reaction may be used. Examples of the catalyst include known catalysts such as dibutyltin oxide, a titanium compound, a dialkoxytin(II), tin(II) oxide, a fatty acid tin(II), tin(II) dioctanoate, and tin(II) distearate.

Examples of the crystalline polyester resin include resins obtained by condensation polymerization of a dihydric or higher hydric alcohol and a divalent or higher valent carboxylic acid. As the dihydric or higher hydric alcohol, 1,4-butanediol or 1,6-hexanediol is preferred. As the divalent or higher valent carboxylic acid, fumaric acid is preferred.

The binder resin is obtained by polymerizing one type or a plurality of types of vinyl polymerizable monomers, for example, aromatic vinyl monomers such as styrene, methylstyrene, methoxystyrene, phenyl styrene, and chlorostyrene, ester-based monomers such as methyl acrylate, ethyl acrylate, butyl acrylate, methyl methacrylate, ethyl methacrylate, and butyl methacrylate, carboxylic acid-containing monomers such as acrylic acid, methacrylic acid, fumaric acid, and maleic acid, amine-based monomers such as amino acrylate, acrylamide, methacrylamide, vinylpyridine, and vinylpyrrolidone, and derivatives thereof, and the like.

The binder resin can also be obtained by polycondensation of a polycondensation-type polymerizable monomer composed of an alcohol component and a carboxylic acid component.

In the polymerization of the polymerizable monomer, any of known auxiliary agents to be used in polymerization of a binder resin such as a chain transfer agent, a crosslinking agent, a polymerization initiator, a surfactant, an aggregating agent, a pH adjusting agent, and an anti-foaming agent can be used.

The toner of the embodiment may contain another additive other than the first fluorescent coloring agent, the second fluorescent coloring agent, the third fluorescent coloring agent, and the binder resin.

As another additive, any of known additives such as a charge control agent, a release agent, and antioxidant can be used.

As the release agent, an ester wax is preferred from the viewpoint that the storage stability of the toner is likely to excel. The ester wax can be synthesized from, for example, a long-chain alkyl carboxylic acid and a long-chain alkyl alcohol by an esterification reaction. Examples of the long-chain alkyl carboxylic acid include palmitic acid, stearic acid, arachidonic acid, behenic acid, lignoceric acid, cerotic acid, and montanic acid. Examples of the long-chain alkyl alcohol include palmityl alcohol, stearyl alcohol, arachidyl alcohol, behenyl alcohol, lignoceryl alcohol, ceryl alcohol, and montanyl alcohol.

A production method for a toner will be described.

The toner of the embodiment can be produced by, for example, a kneading and pulverization method or a chemical method.

Examples of the kneading and pulverization method include a production method including a mixing process in which at least two or more fluorescent coloring agents selected from the group consisting of first to third fluorescent coloring agents, a binder resin, etc. are mixed, thereby obtaining a mixture, a kneading process in which the mixture is melt-kneaded, thereby obtaining a kneaded material, and a pulverization process in which the kneaded material is pulverized, thereby obtaining a pulverized material. The production method may also include a classification process in which the pulverized material is classified as needed.

In the mixing process, the raw materials of the toner are mixed thereby forming a mixture. As a mixer to be used in the mixing process, a known mixer can be used.

In the kneading process, the mixture formed in the mixing process is melt-kneaded, thereby forming a kneaded material. As a kneader to be used in the kneading process, a known kneader can be used.

In the pulverization process, the kneaded material formed in the kneading process is pulverized, thereby forming a pulverized material.

As a pulverizer to be used in the pulverization process, a known pulverizer such as a hammer mill can be used. Further, the pulverized material obtained by the pulverizer may be further finely pulverized. As a pulverizer that further finely pulverizes the pulverized material, a known pulverizer can be used. The pulverized material obtained by the pulverizing process may be used as a toner as it is, or may be subjected to a classification process as needed and used as a toner.

In the classification process, the pulverized material obtained in the pulverization process is classified. As a classifier to be used in the classification process, a known classifier can be used.

The chemical method which is the production method for the toner of the embodiment will be described.

In the chemical method, at least two or more fluorescent coloring agents selected from the group consisting of first to third fluorescent coloring agents, a binder resin, etc. are mixed, thereby forming a mixture. Subsequently, the mixture is melt-kneaded, thereby forming a kneaded material. Subsequently, the kneaded material is pulverized and coarsely granulated, thereby forming moderately pulverized particles. Subsequently, the moderately pulverized particles are mixed with an aqueous medium, thereby preparing a mixed liquid. Subsequently, the mixed liquid is subjected to mechanical shearing, thereby forming a fine particle dispersion liquid. Finally, the fine particles are aggregated in the fine particle dispersion liquid, thereby forming a toner.

The thus produced toner may be used as a toner as it is, or may be mixed with an external additive as needed and used as a toner.

The external additive will be described.

The external additive is added for improving the fluidity, chargeability, and stability during storage of the toner. Examples of the external additive include particles composed of an inorganic oxide. Examples of the inorganic oxide include silica, titania, alumina, strontium titanate, and tin oxide. Further, the particles composed of the inorganic oxide may be subjected to a surface treatment with a hydrophobizing agent from the viewpoint of improvement of stability.

The volume average particle diameter of a particle group of the particles composed of the inorganic oxide is not particularly limited, but is preferably in a range of 8 to 200 nm. When the volume average particle diameter of the particle group of the particles is less than the above lower limit, the transfer efficiency of the toner to a transfer belt or paper may be deteriorated. When the volume average particle diameter of the particle group of the particles exceeds the above upper limit, a photoconductive body may be damaged, or the like.

As the external additive, anyone type may be used alone or two or more types may be used in combination.

The addition amount of the external additive is not particularly limited, but is preferably in a range of 0.2 to 8.0 mass % with respect to the total mass of the toner. To the toner, in addition to the particles composed of the inorganic oxide, resin fine particles with a size of 1 μm or less may be further added.

A method for adding the external additive will be described.

The external additive is, for example, mixed with the toner by a mixer. Examples of the mixer include the same mixers as used in the production method for the toner.

The external additive may be sieved to separate coarse particles, etc. as needed using a sieving device. As the sieving device, a known device can be used.

Hereinafter, a toner cartridge of an embodiment will be described.

The toner cartridge of the embodiment is configured to include the toner of the embodiment described above in a container. As the container, a known container can be used.

The toner of the embodiment is used as a one-component developer or a two-component developer by combining the toner with a carrier.

Hereinafter, an image forming apparatus of an embodiment will described with reference to the drawing.

The image forming apparatus of the embodiment is configured to include the toner of the embodiment described above in an apparatus main body. As the apparatus main body, a general electrophotographic apparatus can be used.

FIG. 1 is a view showing a schematic structure of the image forming apparatus of the embodiment.

An image forming apparatus 20 includes an apparatus main body including an intermediate transfer belt 7, and a first image forming unit 17A and a second image forming unit 17B provided in this order on the intermediate transfer belt 7, and a fixing device 21 provided downstream thereof.

Along the running direction X of the intermediate transfer belt 7, that is, along the direction of the progress of the image forming process, the first image forming unit 17A is provided downstream of the second image forming unit 17B. The fixing device 21 is provided downstream of the first image forming unit 17A.

The first image forming unit 17A includes a photoconductive drum 1a, a cleaning device 16a, a charging device 2a, a light exposing device 3a, a first developing device 4a, and a primary transfer roller 8a. The cleaning device 16a, the charging device 2a, the light exposing device 3a, and the first developing device 4a are provided in this order along the rotational direction of the photoconductive drum 1a. The primary transfer roller 8a is provided on the photoconductive drum 1a through the intermediate transfer belt 7 so as to face the photoconductive drum 1a.

The second image forming unit 17B includes a photoconductive drum 1b, a cleaning device 16b, a charging device 2b, a light exposing device 3b, a second developing device 4b, and a primary transfer roller 8b. The cleaning device 16b, the charging device 2b, the light exposing device 3b, and the second developing device 4b are provided in this order along the rotational direction of the photoconductive drum 1b. The primary transfer roller 8b is provided on the photoconductive drum 1b through the intermediate transfer belt 7 so as to face the photoconductive drum 1b.

In the first developing device 4a and in the second developing device 4b, the toner of the embodiment described above is included. This toner may be configured to be supplied from a toner cartridge (not shown).

To the primary transfer roller 8a, a primary transfer power source 14a is connected. To the primary transfer roller 8b, a primary transfer power source 14b is connected.

To downstream of the first image forming unit 17A, a secondary transfer roller 9 and a backup roller 10 are disposed so as to face each other through the intermediate transfer belt 7. To the secondary transfer roller 9, a secondary transfer power source 15 is connected.

The fixing device 21 includes a heat roller 11 and a press roller 12 disposed so as to face each other.

By the image forming apparatus 20, image formation is performed, for example, as follows.

First, by the charging device 2b, the photoconductive drum 1b is uniformly charged. Subsequently, by the light exposing device 3b, light exposure is performed, whereby an electrostatic latent image is formed. Subsequently, the electrostatic latent image is developed using the toner of the embodiment supplied from the developing device 4b, whereby a second toner image is obtained.

Subsequently, by the charging device 2a, the photoconductive drum 1a is uniformly charged. Subsequently, by the light exposing device 3a, light exposure is performed based on the first image information (second toner image), whereby an electrostatic latent image is formed. Subsequently, the electrostatic latent image is developed using the toner of the embodiment supplied from the developing device 4a, whereby a first toner image is obtained.

The second toner image and the first toner image are transferred in this order onto the intermediate transfer belt 7 using the primary transfer rollers 8a and 8b.

An image in which the second toner image and the first toner image are stacked in this order on the intermediate transfer belt 7 is secondarily transferred onto a recording medium (not shown) through the secondary transfer roller 9 and the backup roller 10. By doing this, an image in which the first toner image and the second toner image are stacked in this order on the recording medium is formed.

A developer containing the toner of the embodiment may be applied to the image forming apparatus shown in FIG. 1. The image forming apparatus shown in FIG. 1 is configured to fix a toner image, but is not limited to this configuration, and a configuration employing an inkjet system may be adopted.

According to the toner of at least one embodiment described above, the toner printed on commercially available paper easily emits light of a color other than blue by irradiation with UV light, and therefore, the visibility on paper excels.

EXAMPLES

Hereinafter, embodiments will be more specifically described by showing Examples.

Toners of Examples 1 to 24 and Comparative Example 1 were produced as follows.

Example 1

The following toner raw materials were placed and mixed in a Henschel mixer (manufactured by Mitsui Mining Co., Ltd.).

The composition of the toner raw materials is as follows.

First fluorescent coloring agent (TINOPAL OB): 3.7 parts by mass

Second fluorescent coloring agent (CARTAX CXDP POWDER): 0.8 parts by mass

Third fluorescent coloring agent (LUMILITE NANO R-Y202): 0.5 parts by mass

Crystalline polyester resin (endothermic peak temperature (melting point): 100° C.): 10 parts by mass Charge control agent (a clathrate compound of a polysaccharide containing aluminum and magnesium): 1 part by mass Amorphous polyester resin: 79.0 parts by mass Ester wax (endothermic peak temperature (melting point): 70° C.) 5 parts by mass A mixture of the above toner raw materials was melt-kneaded using a twin-screw extruder. This melt-kneaded material was cooled and then coarsely pulverized using a hammer mill. Subsequently, this coarsely pulverized material was finely pulverized using a jet pulverizer. Then, this finely pulverized material was classified, whereby a powder was obtained. This powder had a volume average diameter of 7 μm.

100 parts by mass of the thus obtained powder and the following external additive were placed and mixed in a Henschel mixer (manufactured by Mitsui Mining Co., Ltd.), whereby a toner of Example 1 was produced.

The composition of the external additive is as follows.

Hydrophobic silica A (trade name "RX50", manufactured by NIPPON AEROSIL CO., LTD., average primary particle diameter: 35 nm): 1.0 part by mass Hydrophobic silica B (trade name "VP SX110", manufactured by NIPPON AEROSIL CO., LTD., average primary particle diameter: 100 nm): 0.9 parts by mass Hydrophobic titanium oxide (trade name "STT-30S", manufactured by Titan Kogyo, Ltd., average primary particle diameter: 20 nm): 0.5 parts by mass Examples 2 to 23, and Comparative Example 1

Toners of Examples 2 to 23, and Comparative Example 1 were produced in the same manner as in Example 1 except that the toner raw materials were changed according to the composition shown in Table 1.

Example 24

The following toner raw materials were placed and mixed in a Henschel mixer (manufactured by Mitsui Mining Co., Ltd.).

The composition of the toner raw materials is as follows.
Ester wax (endothermic peak temperature (melting point): 70° C.) 5 parts by mass
Crystalline polyester resin (endothermic peak temperature (melting point): 100° C.): 10 parts by mass
Amorphous polyester resin: 79.0 parts by mass
First fluorescent coloring agent (TINOPAL OB): 2.8 parts by mass
Second fluorescent coloring agent (CARTAX CXDP POWDER): 1.1 parts by mass
Third fluorescent coloring agent (LUMILITE NANO R-Y202): 1.1 parts by mass
Charge control agent (a clathrate compound of a polysaccharide containing aluminum and magnesium): 1 part by mass This mixture was melt-kneaded using a twin-screw extruder. This kneaded material was cooled and then coarsely pulverized using a hammer mill. Subsequently, this coarsely pulverized material was further pulverized using a pulverizer (manufactured by Hosokawa Micron Corporation), whereby moderately pulverized particles were obtained. The moderately pulverized particles had a volume average particle diameter of 59 µm.

30 parts by mass of the moderately pulverized particles, 1 part by mass of an anionic surfactant (sodium dodecylbenzenesulfonate), 1 part by mass of triethylamine, and 68 parts by mass of ion exchanged water were placed and stirred in a homogenizer (manufactured by IKA Corporation), whereby a mixed liquid was obtained.

The obtained mixed liquid was placed in a Nanomizer (YSNM-2000AR, manufactured by Yoshida Kikai Co., Ltd.) and processed repeatedly three times at 120° C. at a processing pressure of 150 MPa, whereby a fine particle dispersion liquid was obtained. The volume average particle diameter of the fine particles in the fine particle dispersion liquid was 0.7 µm (measured using SALD-7000 manufactured by Shimadzu Corporation) and the pH of the fine particle dispersion liquid was 8.3.

Subsequently, the fine particle dispersion liquid was diluted such that the solid content concentration was 18 mass %. While maintaining the temperature of the diluted liquid at 30° C., 0.1 M hydrochloric acid was added dropwise to the diluted liquid until the pH reached 7.0. The volume average particle diameter of the fine particles in the diluted liquid was 0.83 Further, 0.1 M hydrochloric acid was added dropwise to the diluted liquid, and when the potential of the fine particles reached −30 mV, the dropwise addition was completed. The pH at this time was 3.8.

Subsequently, the temperature of the diluted liquid was raised to 80° C. at a rate of 10° C./min while stirring the diluted liquid with a paddle blade (at 500 rpm), and then the diluted liquid was maintained at 80° C. for one hour. After cooling, the diluted liquid was left to stand overnight. The supernatant in the diluted liquid after being left was transparent, and unaggregated particles were not observed. The volume average diameter of the particles in the diluted liquid was 6 µm, and particles having a volume average diameter of 20 µm or more were not observed. The diluted liquid was dried using a vacuum dryer until the water content was decreased to 0.8 mass % or less, whereby toner particles were obtained. The toner particles had a volume average diameter of 6 µm. 100 parts by mass of the thus obtained toner particles and the following external additive were placed and mixed in a Henschel mixer, whereby a toner of Example 24 was produced.

The composition of the external additive was the same as in Example 1 to 23.

Subsequently, 6 parts by mass of each of the toners of Examples 1 to 24 and Comparative Example 1 and 100 parts by mass of a ferrite carrier surface-coated with a silicone resin and having an average particle diameter of 40 µm were stirred in a Turbula mixer, whereby a developer was prepared. By using this developer, the fluorescence peak and visibility of each of the above toners were evaluated as follows.

A measurement method for a fluorescence peak wavelength will be described.

3.0 g of each of the toners of Examples 1 to 24 and Comparative Example 1 was formed into a pellet having a diameter of 3 cm and a thickness of 2 mm. With respect to the prepared pellet, an image luminescence intensity was measured using a spectrofluorophotometer "RF-6000" (manufactured by Shimadzu Corporation). The measurement conditions were set as follows: excitation wavelength: 370 nm, fluorescence start wavelength: 300 nm, fluorescence end wavelength: 700 nm, and scan speed: 6000 nm/min. The maximum peak position of the measured fluorescence spectrum was read and recorded as the fluorescence peak wavelength. The measurement results are shown in Table 1. In Table 1, the wavelength at the maximum peak position measured in a wavelength region of 400 nm or more and less than 500 nm is shown as a first fluorescence peak, the wavelength at the maximum peak position measured in a wavelength region of 500 nm or more and less than 600 nm is shown as a second fluorescence peak, and the wavelength at the maximum peak position measured in a wavelength region of 600 nm or more and less than 650 nm is shown as a third fluorescence peak.

TABLE 1

| | First fluorescent coloring agent Addition amount [%] a | Second fluorescent coloring agent Addition amount [%] b | Third fluorescent coloring agent Addition amount [%] c | Amorphous polyester resin Addition amount [%] | a/(b + c) | a + b + c | Fluorescence peak wavelength [nm] | | | Visibility |
|---|---|---|---|---|---|---|---|---|---|---|
| | | | | | | | First fluorescence peak | Second fluorescence peak | Third fluorescence peak | |
| Example 1 | 3.70 | 0.80 | 0.50 | 79.0 | 2.85 | 5.0 | 470 | 550 | 620 | B |
| Example 2 | 2.80 | 1.10 | 1.10 | 79.0 | 1.27 | 5.0 | 470 | 550 | 620 | B |
| Example 3 | 1.90 | 1.00 | 2.10 | 79.0 | 0.61 | 5.0 | 470 | 550 | 620 | A |
| Example 4 | 1.70 | 1.65 | 1.65 | 79.0 | 0.52 | 5.0 | 470 | 550 | 620 | A |

TABLE 1-continued

|  | First fluorescent coloring agent Addition amount [%] a | Second fluorescent coloring agent Addition amount [%] b | Third fluorescent coloring agent Addition amount [%] c | Amorphous polyester resin Addition amount [%] | a/(b + c) | a + b + c | Fluorescence peak wavelength [nm] | | | Visibility |
|---|---|---|---|---|---|---|---|---|---|---|
|  |  |  |  |  |  |  | First fluorescence peak | Second fluorescence peak | Third fluorescence peak |  |
| Example 5 | 3.60 | 1.40 | 0.00 | 79.0 | 2.57 | 5.0 | 470 | 550 | — | B |
| Example 6 | 2.90 | 2.10 | 0.00 | 79.0 | 1.38 | 5.0 | 470 | 550 | — | B |
| Example 7 | 2.00 | 3.00 | 0.00 | 79.0 | 0.67 | 5.0 | 470 | 550 | — | A |
| Example 8 | 1.67 | 0.00 | 3.33 | 79.0 | 0.50 | 5.0 | 470 | — | 620 | A |
| Example 9 | 0.00 | 2.67 | 2.33 | 79.0 | 0.00 | 5.0 | — | 550 | 620 | B |
| Example 10 | 11.25 | 3.75 | 0.00 | 69.0 | 3.00 | 15.0 | 470 | 550 | — | B |
| Example 11 | 10.00 | 2.00 | 3.00 | 69.0 | 2.00 | 15.0 | 470 | 550 | 620 | B |
| Example 12 | 5.00 | 0.00 | 10.00 | 69.0 | 0.50 | 15.0 | 470 | — | 620 | A |
| Example 13 | 3.40 | 5.80 | 5.80 | 69.0 | 0.29 | 15.0 | 470 | 550 | 620 | A |
| Example 14 | 0.20 | 0.20 | 0.10 | 83.5 | 0.67 | 0.5 | 470 | 550 | 620 | B |
| Example 15 | 0.07 | 0.43 | 0.00 | 83.5 | 0.16 | 0.5 | 470 | 550 | — | B |
| Example 16 | 0.00 | 0.30 | 0.20 | 83.5 | 0.00 | 0.5 | — | 550 | 620 | C |
| Example 17 | 4.68 | 0.66 | 0.66 | 78.0 | 3.55 | 6.0 | 470 | 550 | 620 | C |
| Example 18 | 7.60 | 0.80 | 1.60 | 74.0 | 3.17 | 10.0 | 470 | 550 | 620 | C |
| Example 19 | 12.00 | 1.80 | 1.20 | 69.0 | 4.00 | 15.0 | 470 | 550 | 620 | C |
| Example 20 | 0.034 | 0.033 | 0.033 | 83.9 | 0.52 | 0.1 | 470 | 550 | 620 | C |
| Example 21 | 0.050 | 0.475 | 0.475 | 83.0 | 0.05 | 1.0 | 470 | 550 | 620 | B |
| Example 22 | 21.00 | 5.50 | 3.50 | 54.0 | 2.33 | 30.0 | 470 | 550 | 620 | B |
| Example 23 | 33.70 | 5.00 | 6.30 | 39.0 | 2.98 | 45.0 | 470 | 550 | 620 | B |
| Example 24 | 2.80 | 1.10 | 1.10 | 79.0 | 1.27 | 5.0 | 470 | 550 | 620 | B |
| Comparative Example 1 | 5.00 | 0.00 | 0.00 | 79.0 | — | 5.0 | 470 | — | — | D |

An evaluation method for visibility will be described.

By using commercially available e-studio 5005 (manufactured by Toshiba Tec Corporation), a solid image was obtained at a toner adhesion amount of around 1.0 mg/cm$^2$ on 90 g/m$^2$ paper manufactured by Mondi Limited and containing a fluorescent whitening agent. When the obtained solid image was irradiated with black light (wavelength: 370 nm), a case where visible light of a color other than blue could be clearly recognized was evaluated as "A", a case where visible light of a color other than blue could be recognized was evaluated as "B", a case where visible light of a color other than blue could be slightly recognized was evaluated as "C", and a case where visible light of a color other than blue could not be recognized was evaluated as "D". As shown in Table 1, the toners of Examples were all evaluated as "A", "B", or "C".

While certain embodiments have been described, these embodiments have been presented by way of example only, and are not intended to limit the scope of the inventions. Indeed, the novel embodiments described herein may be embodied in a variety of other forms, furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A toner comprising:
at least two or more fluorescent coloring agents selected from the group consisting of a first fluorescent coloring agent which when irradiated with UV light emits fluorescent light that has a fluorescence peak in a wavelength region of 400 nm or more and less than 500 nm, a second fluorescent coloring agent which when irradiated with UV light emits fluorescent light that has a fluorescence peak in a wavelength region of 500 nm or more and less than 600 nm, and a third fluorescent coloring agent which when irradiated with UV light emits fluorescent light that has a fluorescence peak in a wavelength region of 600 nm or more and less than 650 nm; and
a binder resin.

2. A toner comprising: a first fluorescent coloring agent which has a fluorescence peak in a wavelength region of 400 nm or more and less than 500 nm;
one or more fluorescent coloring agents selected from the group consisting of a second fluorescent coloring agent which has a fluorescence peak in a wavelength region of 500 nm or more and less than 600 nm and a third fluorescent coloring agent which has a fluorescence peak in a wavelength region of 600 nm or more and less than 650 nm; and
a binder resin.

3. The toner according to claim 2, comprising the first fluorescent coloring agent and the second fluorescent coloring agent.

4. The toner according to claim 2, comprising the first fluorescent coloring agent and the third fluorescent coloring agent.

5. The toner according to claim 2, comprising the first fluorescent coloring agent, the second fluorescent coloring agent, and the third fluorescent coloring agent.

6. The toner according to claim 2, wherein the following formula (2) is satisfied:

$$0.05 \leq a/(b+c) \leq 3.0 \tag{2},$$

wherein a represents the content (mass %) of the first fluorescent coloring agent with respect to 100 mass % of the total amount of the toner, b represents the content (mass %) of the second fluorescent coloring agent with respect to 100 mass % of the total amount of the toner, and c represents the content (mass %) of the third fluorescent coloring agent with respect to 100 mass % of the total amount of the toner.

7. The toner according to claim 6, wherein the following formula (4) is satisfied:

$$0.1 \leq a/(b+c) \leq 1.5 \quad (4).$$

8. The toner according to claim 7, wherein the following formula (6) is satisfied:

$$0.2 \leq a/(b+c) \leq 1.0 \quad (6).$$

9. The toner according to claim 2, wherein the following formula (1) is satisfied:

$$0.1 \leq a+b+c \leq 45 \quad (1),$$

wherein a represents the content (mass %) of the first fluorescent coloring agent with respect to 100 mass % of the total amount of the toner, b represents the content (mass %) of the second fluorescent coloring agent with respect to 100 mass % of the total amount of the toner, and c represents the content (mass %) of the third fluorescent coloring agent with respect to 100 mass % of the total amount of the toner.

10. The toner according to claim 9, wherein the following formula (3) is satisfied:

$$0.5 \leq a+b+c \leq 30 \quad (3).$$

11. The toner according to claim 10, wherein the following formula (5) is satisfied:

$$2 \leq a+b+c \leq 20 \quad (5).$$

12. The toner according to claim 2, wherein the following formulae (1) and (2) are satisfied:

$$0.1 \leq a+b+c \leq 45 \quad (1), \text{ and}$$

$$0.05 \leq a/(b+c) \leq 3.0 \quad (2),$$

wherein a represents the content (mass %) of the first fluorescent coloring agent with respect to 100 mass % of the total amount of the toner, b represents the content (mass %) of the second fluorescent coloring agent with respect to 100 mass % of the total amount of the toner, and c represents the content (mass %) of the third fluorescent coloring agent with respect to 100 mass % of the total amount of the toner.

13. The toner according to claim 12, wherein the following formulae (3) and (4) are satisfied:

$$0.5 \leq a+b+c \leq 30 \quad (3), \text{ and}$$

$$0.1 \leq a/(b+c) \leq 1.5 \quad (4).$$

14. The toner according to claim 13, wherein the following formulae (5) and (6) are satisfied:

$$2 \leq a+b+c \leq 20 \quad (5), \text{ and}$$

$$0.2 \leq a/(b+c) \leq 1.0 \quad (6).$$

15. A toner cartridge, comprising the toner according to claim 1.

16. An image forming apparatus, comprising the toner according to claim 1.

17. A method for forming an image that is visible upon irradiation with UV light, comprising printing the toner according to claim 1 on a recording medium to form the image.

18. The method according to claim 17, wherein the recording medium is a paper comprising a fluorescent whitening agent.

19. A recording medium comprising an image that is visible upon irradiation with UV light, obtained by the method according to claim 17.

20. A method for reading an image that is visible upon irradiation with UV light, comprising irradiating the recording medium according to claim 19 with UV light and reading the fluorescence emitted.

21. The toner according to claim 1, wherein the following formula (2) is satisfied:

$$0.05 \leq a/(b+c) \leq 3.0 \quad (2),$$

wherein a represents the content (mass %) of the first fluorescent coloring agent with respect to 100 mass % of the total amount of the toner, b represents the content (mass %) of the second fluorescent coloring agent with respect to 100 mass % of the total amount of the toner, and c represents the content (mass %) of the third fluorescent coloring agent with respect to 100 mass % of the total amount of the toner.

* * * * *